(12) United States Patent
Babazadeh et al.

(10) Patent No.: US 11,597,411 B2
(45) Date of Patent: Mar. 7, 2023

(54) MAGNETIC LEVITATION TRAIN SYSTEM WITH AN ASYMMETRICAL POWER DISTRIBUTION

(71) Applicant: HYPERLOOP TRANSPORTATION TECHNOLOGIES, INC., Culver City, CA (US)

(72) Inventors: Amir Babazadeh, Laguna Hills, CA (US); Siavash Sadeghi, Lake Forest, CA (US); Andrea La Mendola, Los Angeles, CA (US)

(73) Assignee: HYPERLOOP TRANSPORTATION TECHNOLOGIES, INC., Culver City, CA (US)

( * ) Notice: Subject to any disclaimer, the term of this patent is extended or adjusted under 35 U.S.C. 154(b) by 571 days.

(21) Appl. No.: 16/584,002

(22) Filed: Sep. 26, 2019

(65) Prior Publication Data
US 2021/0094590 A1    Apr. 1, 2021

(51) Int. Cl.
*B61B 13/08*    (2006.01)
*B60L 13/10*    (2006.01)
*B60L 15/00*    (2006.01)

(52) U.S. Cl.
CPC .............. *B61B 13/08* (2013.01); *B60L 13/10* (2013.01); *B60L 15/005* (2013.01); *B60L 2200/26* (2013.01)

(58) Field of Classification Search
CPC ......... B61B 13/08; B61B 13/10; B60L 13/10; B60L 15/005; B60L 2200/26
See application file for complete search history.

(56) References Cited

FOREIGN PATENT DOCUMENTS

| WO | WO-2019045422 A1 | * | 3/2019 | .............. B60L 13/04 |
| WO | WO-2019124812 A1 | * | 6/2019 | .............. B60L 13/04 |

* cited by examiner

*Primary Examiner* — Robert J McCarry, Jr.
(74) *Attorney, Agent, or Firm* — Lucas & Mercanti, LLP

(57) ABSTRACT

A magnetic levitation train system with an asymmetrical power distribution is provided, having a train which is moved through a track that is at least partly located within an airless tube, the track having at least two stations, having each section of the track between two correlative stations the following zones:
  an acceleration zone located at the beginning of the section, having a plurality of consecutive winding segments electrically connected to each other and to a current supply,
  a deceleration zone, comprising a plurality of consecutive winding segments electrically connected to each other and to a current supply, and
  a cruise zone in which the train is moved on a cruise speed, located between the acceleration zone and the deceleration zone, having a plurality of winding segments electrically connected to a current supply, and comprising a plurality of empty spaces between some of the winding segments.

6 Claims, 4 Drawing Sheets

MAGNETIC LEVITATION TRAIN SYSTEM WITH AN ASYMMETRICAL POWER DISTRIBUTION

BACKGROUND OF THE INVENTION

Field of the Invention

The present invention is related to a magnetic levitation train system, specifically to the use of asymmetrical power distribution for improving efficiency throughout the track.

Description of Related Art

The use of trains, a type of transport consisting of a series of connected vehicles that generally runs along a rail track to transport cargo or passengers, have been used for a long time as a suitable transport method for all types of distances for travel by land.

Motive power for a conventional train is provided by a separate locomotive or individual motors in a self-propelled multiple unit. Although historically steam propulsion dominated, the most common types of locomotive nowadays are diesel and electric, the latter supplied by overhead wires or additional rails.

One of the problems of a conventional train system is the inefficient power consumption, as most of the power is wasted to counter air drag and drag friction.

To solve this issue the magnetic levitation train system was conceived, in which repelling magnetic forces are applied to levitate the trains. Said forces are produced by magnets placed on the train which interact with a passive conducting track to levitate the train. By utilizing passive magnetic levitation, it is possible to reduce the drag friction to a minimum, which results in lower power consumption.

Additionally, the maglev (magnetic levitation train) system uses another set of magnets to move the train ahead at great speed taking advantage of the lack of friction.

Some maglev systems propose the use of evacuated (airless) tubes, which remove air drag. This has the potential to increase speed and efficiency greatly, as most of the power for conventional maglev systems is lost because of the aerodynamic drag.

The power distribution of a traditional maglev system comprises that the power is provided to the entirety of the track, so expensive winding segments must be installed along the complete track and all of them must be electrically coupled to a current supply constantly.

The document U.S. Pat. No. 4,840,125A presents a magnetic levitation train system in which the track is divided in sub regions and the power is only supplied to the sub region where the train is located, which is economically beneficial since the system does not supply energy to the whole track constantly.

The main problem with the system of the document U.S. Pat. No. 4,840,125A is that each of the sub-regions must be provided with the same power regardless of speed and expected power consumption of the maglev system and the complete track must comprise winding segments, which is inefficient because the maglev system needs more power when it should accelerate or decelerate rather than when the train travels at a maximum constant speed.

For all the reasons explained above it can be said that the power distributions in maglev systems are usually designed regardless of the speed profile (acceleration, cruise/steady state and deceleration), which is not efficient and cost effective, especially for long tracks.

SUMMARY OF THE INVENTION

It is an object of the present invention to provide a magnetic levitation train system with an asymmetrical power distribution that increases the efficiency and reduce the necessary investment in the installation and maintenance of the power distribution.

The magnetic levitation train system with an asymmetrical power distribution of the invention comprises a train which is moved through a track that is at least partly located within an airless tube, the track having at least two stations in which the train stop, for example in order to let people go in or out of the train. Each section of the track located between two correlative stations comprises the following zones:

an acceleration zone in which the train starts moving until it reaches a cruise speed, located at the beginning of the section of the track between two correlative stations and comprising a plurality of consecutive winding segments all along this section of the track, being the winding segments electrically connected to each other and to a current supply, a deceleration zone in which the train brakes from the cruise speed until it stops, located at the end of the section of the track between two correlative stations and comprising a plurality of consecutive winding segments electrically connected to each other and to a current supply, and a cruise zone in which the train is moved on the cruise speed, located between the acceleration zone and the deceleration zone, comprising a plurality of winding segments electrically connected to a current supply, and comprising a plurality of empty spaces between some of the winding segments.

In the cruise zone, as there is no air drag or drag friction and no variation of speed, there is no need to provide constantly power to the magnetic levitation train system. For this same reason winding segments are not installed consecutively, the winding segments are placed leaving empty spaces between them, in such a way that it is assured that the cruise speed of the maglev system in the cruise zone does not fall below 1% to 3% from the maximum speed.

In the acceleration zone consecutive winding segments are necessary so the train can reach the cruise speed. Preferably, the winding segments in this zone increase its length alongside the direction of movement of the train. At the beginning of the course the length of the winding segments would be at their minimum in order to prioritize power over speed, this allow the power to be used to accelerate rather than to be dissipated in the winding. Once the speed increases the priority changes to a gradual mayor focus on speed, so the winding segments increase in length to allow a better application of the magnetic forces.

In the deceleration zone, the braking of the train is achieved. In this zone, motor connections of the train are altered to turn them into electrical generators, so the speed of the train, during braking, is transformed into power and sent it back into the current supply. The consecutive windings segments in the deceleration zone decrease its length alongside the direction of movement of the train, in order to better absorb the transformed power into the current supply. Once the speed of the train is reduced, the length of the winding segments is reduced in order to absorb the transformed power in a more efficient manner.

Preferably, the cruise zone comprises low cost winding segments disposed on the empty spaces created between the winding segments. The cited low cost winding segments permit the train to reach at a sub cruise speed the next station on the track when a failure has occurred and the train stopped at the cruise zone.

Preferably, the train also comprises a bogie with a motor powered by onboard batteries and supporting wheels that permit the movement of the train through the track by contact. Thus, when a failure has occurred at the cruise zone, the motor helps the train to reach at a sub cruise speed the nearest station.

Preferably, the cruise zone comprises acceleration winding segments, which are larger than the winding segments on the cruise zone and its length permit the train to reach the cruise speed.

DETAILED DESCRIPTION OF THE INVENTION

The magnetic levitation train system with an asymmetrical power distribution of the invention comprises a train 1 for passenger and/or freight transportation, formed at least by a capsule or a locomotive, which is moved through a track 2 that is partly or completely located within an airless (evacuated) tube. When the train 1 moves within the airless tube, the train 1 travels almost free of air resistance or friction, which permits the train 1 to reach a high speed very efficiently.

Figure 1:
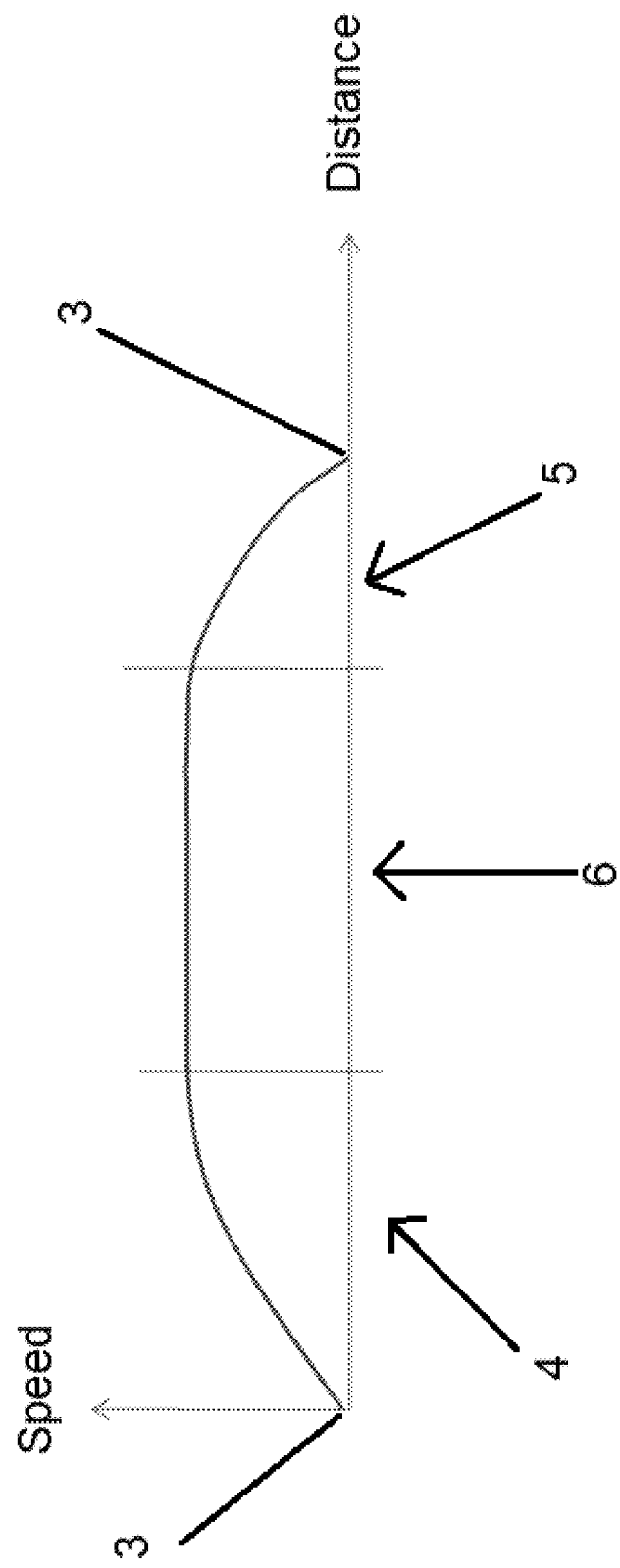
FIG. 1 shows a graph showcasing the speed profile alongside the three zones (acceleration, cruise and deceleration).

The track 2 of the system has at least two stations 3 in which the train 1 stops, for example in order to let people go in or out of the train. As it is shown in FIG. 1, each section of the track 2 located between two correlative stations 3 comprises the following zones:

an acceleration zone 4 in which the train 1 starts moving until it reaches a cruise speed, that is an interval of 97% to 100% of the maximum speed at which the train can move. This acceleration zone 4 is located at the beginning of the section of the track 2 between two correlative stations 3, comprising a plurality of consecutive winding segments 7 electrically connected to each other and to a current supply 9, in order to permit the train 1 to reach the cruise speed. The main purpose of this zone is applying the maximum possible power to the train 1 so as to accelerate it until it reaches the cruise speed.

a deceleration zone 5 in which the train 1 brakes from the cruise speed until it stops. The deceleration zone 5 is located at the end of the section of the track 2 between two correlative stations 3, comprising a plurality of consecutive winding segments 7 electrically connected to each other and to a current supply 9. The purposes of this zone are permitting the braking of the train 1 and transforming back into power the speed of the train 1, power that is sent back into the current supply 9.

a cruise zone 6 in which the train 1 is moved on the cruise speed, located between the acceleration zone 4 and the deceleration zone 5, comprising a plurality of winding segments 7 electrically connected to a current supply 9, and comprising a plurality of empty spaces 8 between some of the winding segments 7.

Hypothetically, if the train 1 would move with no friction of any type against it, once the cruise speed would be reached, the train 1 would move at a constant speed without applying any power on it. In view that in the airless tube the drag friction and air drag are very small, the cruise zone 6 require less amount of power in order to move the train 1 at a constant speed. Since less amount of power is needed, the winding segments 7 in the cruise zone 6 can be spaced, allowing the existence of empty spaces 8 between some of the winding segments 7, designed in a way that the speed drop is small. Using this approach, fewer winding segments 7 are used in the cruise zone 6, which is the larger section of the track 2 between two correlative stations 3, and that leads to a cheaper solution since the cost of copper and management cost of the power system will drop.

Figure 2:
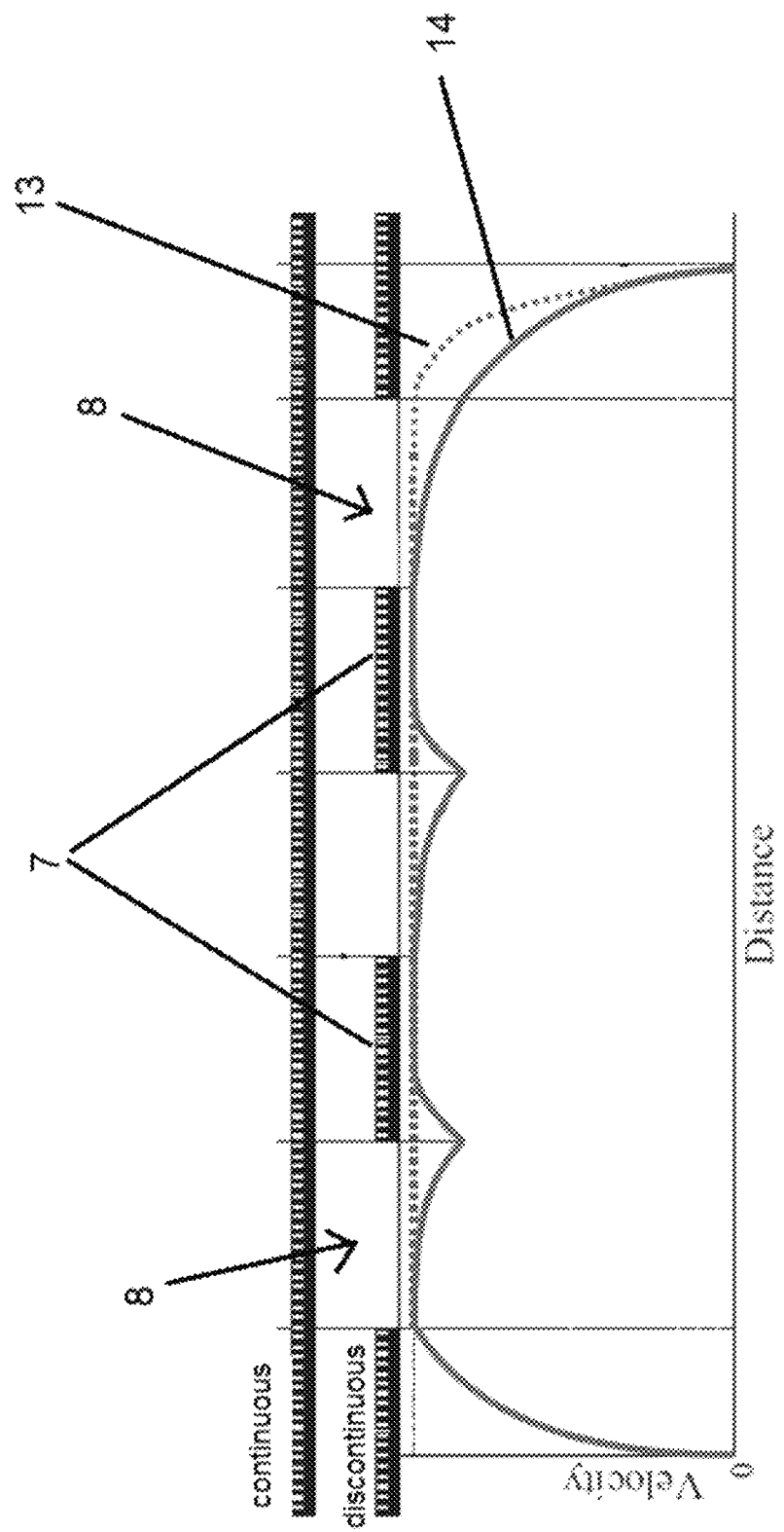
FIG. 2 shows a graph showing the difference in terms of speed between a discontinuous arrangement of winding segments and a continuous arrangement of winding segments.

The FIG. 2 shows a graph where a comparison is made between the speed variation of a known solution 13, in which in the cruise zone consecutive winding segments are placed, and the speed variation of the invention 14, in which in the cruise zone 6 empty spaces 8 are located between some of the winding segments 7. As it can be observed, the variation of speed is almost unnoticeable.

Figure 3:
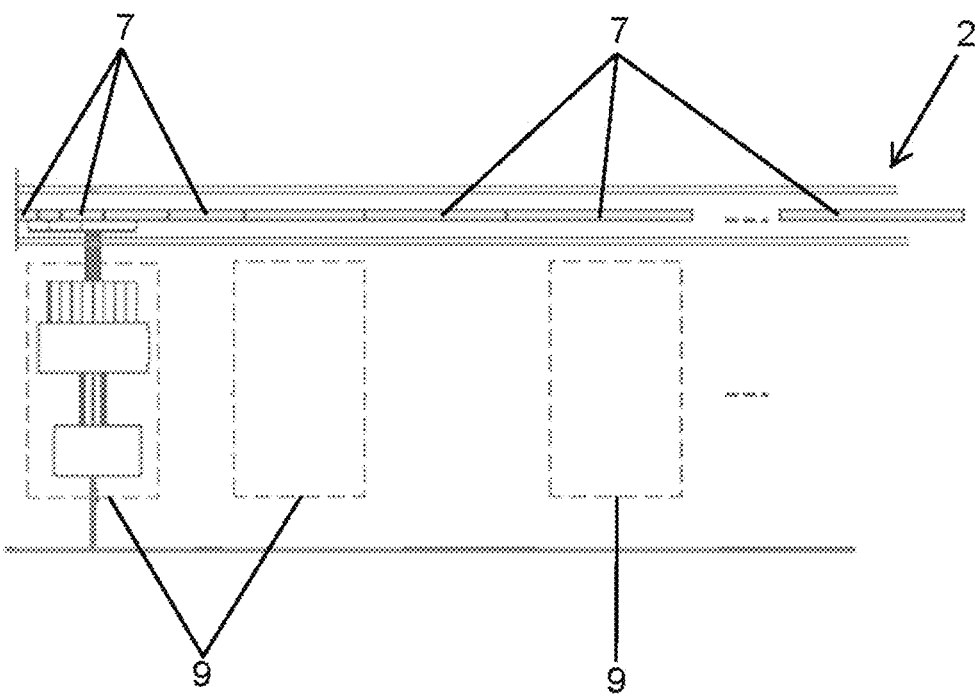
FIG. 3 shows the increment in length of the winding segments in the acceleration zone.

As shown in the FIG. 3, in the acceleration zone 4, the winding segments 7 are at their minimum length at the beginning of the zone, and the length of the winding segments 7 increases alongside the direction of travel. The reason of this is that the length of the winding segments 7 has a direct impact on the power system efficiency and power factor. Since at the beginning of the travel the speed of the train 1 is low, the length of the winding segments 7 can be shorter, in such a way that more power goes to the train 1.

In the deceleration zone 5 the length of the winding segments 7 varies in relation to the expected speed of the train 1. When the speed is at the cruise speed the length of the winding segments 7 is also at its maximum size, while the lower the expected speed the smaller the length of the winding segments 7 are. During braking of the train 1, motor connections of the train 1 are altered in order to turn them into electrical generators, so the speed of the train 1 is transformed back in power, which is then sent back into the current supply 9 through the winding segments 7.

The winding segments 7 can be connected in series, in parallel or in a mixed (series-parallel) configuration, based on the speed and power needed in each section of the track 2.

Figure 4:
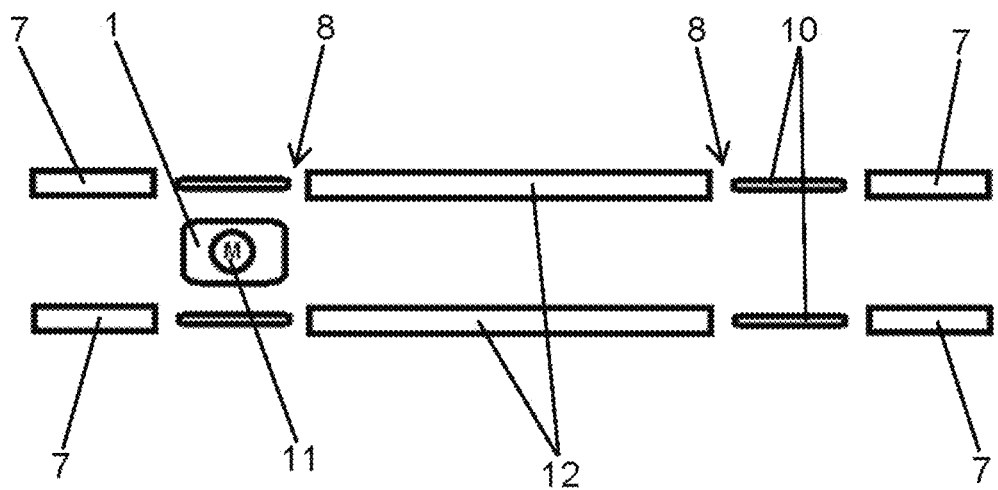
FIG. 4 shows elements that the invention comprises so as to bring the capsule to a station on the track when the capsule is stopped in the cruise zone.

As it is shown in FIG. 4, the magnetic levitation train system comprises some systems that avoid that when the train 1 stops or its speed is reduced on the cruise zone 6 due to a mistake or a failure in the train 1 and/or in the track 2, the train 1 remains still in the position when the failure occurred, so the train 1 can be moved to the next station 3 on the track 2.

In order to solve this problem, the invention comprises low cost winding segments 10 that are disposed on the empty spaces 8 between the winding segments 7. The cited low cost winding segments 10 permit the train 1 to reach at a sub cruise speed the next station 3 on the track 2, where the train 1 could be repaired in case that the train 1 stopped due to a problem on the same.

Furthermore, the bogie 15 of the train 1 comprises a motor 11 powered by onboard batteries 16 and supporting wheels that could be disposed in contact with the track 2 and permit the movement of the train 1 through the track 2. Therefore, in case that the train 1 is stopped at the cruise zone 6, the cited motor 11 moves at a sub cruise speed the train 1 through its supporting wheels so the next station 3 on the track 2 is reached.

Preferably, the cruise zone 6 comprises also some acceleration winding segments 12, which are larger than the rest of the winding segments 7 on the cruise zone 6, having a length that they permit the train 1 to reach the cruise speed again in case there is no faulty conditions on the system. The motor 11 on the train 1 and the low cost winding segments 10 help the train 1 to reach these acceleration winding segments 12 at a sub cruise speed.

Figure 5:
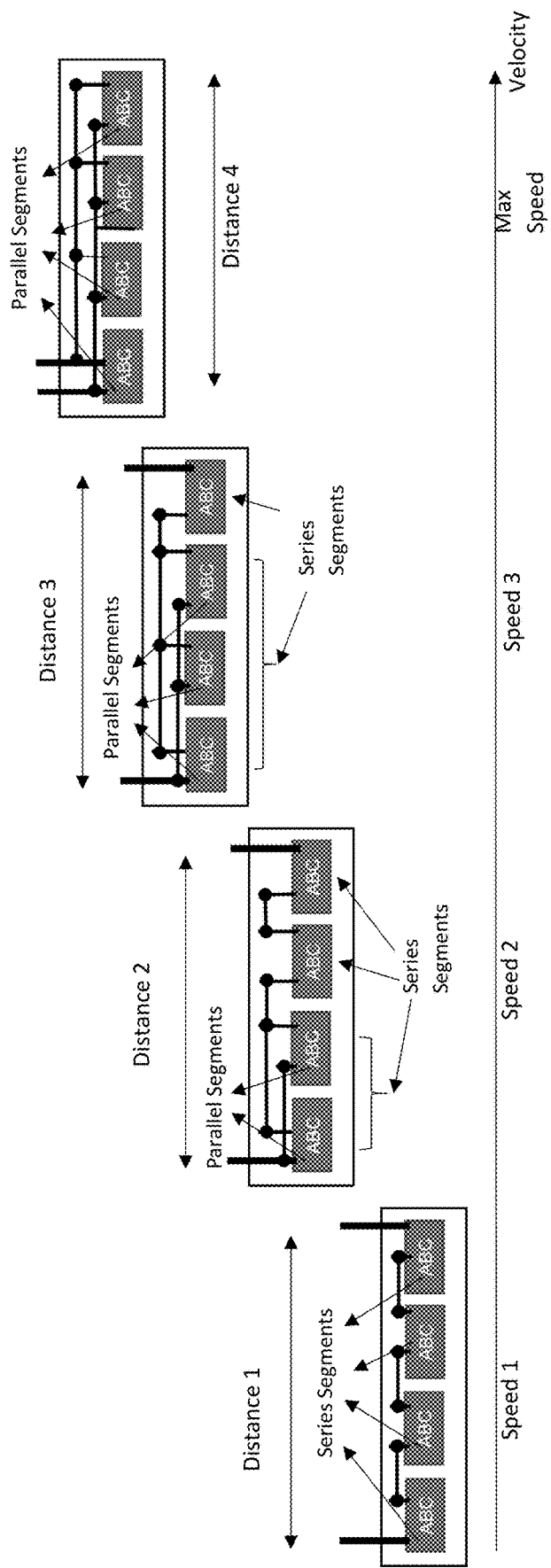
FIG. 5 shows the optimal connections for a typical four segmented propulsion linear motor

FIG. 5 shows the optimal connections for a typical four segment propulsion linear motor. In this example in each module, of a four segmented propulsion linear motor, the segments are connected in series, series-parallel, and parallel configuration based on the velocity of the maglev. Based on the required power and forces the number of segments and modules can be varied.

Also, based on the velocity and required acceleration, the distances in which the connection between segments should change can be defined. And based on the aforementioned distances and the voltage limit, the number of series modules can be defined.

The invention claimed is:

1. Magnetic levitation train system with an asymmetrical power distribution, comprising a train which is moved through a track that is at least partly located within an airless tube, the track having at least two stations, comprising each section of the track between two correlative stations the following zones:

an acceleration zone in which the train starts moving until it reaches a cruise speed, located at the beginning of the section of the track between two correlative stations, comprising a first plurality of consecutive winding segments electrically connected to each other and to a current supply, a deceleration zone in which the train brakes from the cruise speed until it stops, located at the end of the section of the track between two correlative stations, comprising a second plurality of consecutive winding segments electrically connected to each other and to a current supply, and a cruise zone in which the train is moved on the cruise speed, located between the acceleration zone and the deceleration zone, comprising a plurality of non-consecutive winding segments electrically connected to a current supply, and comprising a plurality of empty spaces located respectively between selected non-consecutive winding segments;

wherein the first and second pluralities of consecutive winding segments and the plurality of non-consecutive winding segments produce an asymmetrical power distribution adapted to power a magnetic levitation train system.

2. The magnetic levitation train system with an asymmetrical power distribution of claim 1, wherein the winding segments on the acceleration zone increase its length alongside the direction of movement of the train.

3. The magnetic levitation train system with an asymmetrical power distribution of claim 1, wherein the winding segments on the deceleration zone decrease its length alongside the direction of movement of the train.

4. The magnetic levitation train system with an asymmetrical power distribution of claim 1, wherein the cruise zone comprises second winding segments disposed on the empty spaces between the winding segments.

5. The magnetic levitation train system with an asymmetrical power distribution of claim 1, wherein the train comprises a bogie with a motor powered by onboard batteries and supporting wheels that permit the movement of the train through the track by contact.

6. The magnetic levitation train system with an asymmetrical power distribution of claim 4, wherein the cruise zone comprises acceleration winding segments, which are larger than the winding segments on the cruise zone and its length permit the train to reach the cruise speed when the train is stopped.

* * * * *